US005578404A

United States Patent [19]
Kliem

[11] Patent Number: 5,578,404
[45] Date of Patent: Nov. 26, 1996

[54] PROCESS FOR THE PRODUCTION OF LIQUID CRYSTAL DISPLAY

[75] Inventor: Peter O. Kliem, Wellesley, Mass.

[73] Assignee: Polaroid Corporation, Cambridge, Mass.

[21] Appl. No.: 411,577

[22] Filed: Mar. 27, 1995

[51] Int. Cl.⁶ ........................................................ G03F 9/00
[52] U.S. Cl. .................................. 430/7; 430/20; 359/54; 359/55; 359/68; 359/891
[58] Field of Search ................................... 430/6, 7, 220, 430/347, 20; 359/54, 55, 68, 891

[56] References Cited

U.S. PATENT DOCUMENTS

| Re. 23,297 | 11/1950 | Hyman et al. ............................. 88/65 |
|---|---|---|
| 2,445,555 | 7/1948 | Binda ........................................ 88/65 |
| 3,742,600 | 7/1973 | Lowell ...................................... 29/592 |
| 4,050,786 | 9/1977 | Feldman ................................... 350/160 |
| 4,066,814 | 1/1978 | Chiklis ...................................... 428/333 |
| 4,166,871 | 9/1979 | Schuler ..................................... 427/163 |
| 4,602,263 | 7/1986 | Borrer et al. .............................. 346/201 |
| 4,610,509 | 9/1986 | Sorimachi et al. ................... 350/339 F |
| 4,674,840 | 6/1987 | Bennett ..................................... 350/337 |
| 4,720,449 | 1/1988 | Borrer et al. .............................. 430/338 |
| 4,720,450 | 1/1988 | Ellis .......................................... 430/339 |
| 4,734,174 | 3/1988 | Venis, Jr. ................................ 204/129.5 |
| 4,743,098 | 5/1988 | Dickerson et al. ................... 350/339 F |
| 4,745,046 | 5/1988 | Borrer et al. .............................. 430/332 |
| 4,759,611 | 7/1988 | Downey, Jr. ............................. 350/337 |
| 4,818,742 | 4/1989 | Ellis .......................................... 503/201 |
| 4,826,976 | 5/1989 | Borrer et al. ............................ 544/58.4 |
| 4,839,335 | 6/1989 | Ellis .......................................... 503/224 |
| 4,894,358 | 1/1990 | Filosa et al. .............................. 503/201 |
| 4,960,901 | 10/1990 | Borrer et al. .............................. 548/207 |
| 5,034,736 | 7/1991 | Bennett et al. ............................ 340/784 |
| 5,053,298 | 10/1991 | Park et al. ..................................... 430/7 |
| 5,087,114 | 2/1992 | Fukui et al. ............................... 359/81 |
| 5,093,738 | 3/1992 | Watanabe et al. ......................... 359/68 |
| 5,142,395 | 8/1992 | Yamazaki et al. ......................... 359/81 |
| 5,202,787 | 4/1993 | Byker et al. ............................. 359/267 |
| 5,229,232 | 7/1993 | Longobard et al. .......................... 430/7 |
| 5,231,527 | 7/1993 | Takanashi et al. ......................... 359/81 |
| 5,236,884 | 8/1993 | Boggs et al. ............................. 503/201 |
| 5,243,052 | 9/1993 | Taylor et al. ............................. 546/154 |
| 5,257,122 | 10/1993 | Duebal et al. ............................. 359/75 |
| 5,268,782 | 12/1993 | Wenz et al. ................................ 359/81 |
| 5,278,031 | 1/1994 | Boggs et al. ............................. 430/348 |
| 5,279,913 | 1/1994 | Van Doorn .................................. 430/7 |
| 5,286,612 | 2/1994 | Telfer ...................................... 430/335 |
| 5,334,489 | 8/1994 | Grasshoff et al. ....................... 430/335 |
| 5,358,810 | 10/1994 | Yoshino .................................... 430/20 |
| 5,379,139 | 1/1995 | Sato et al. ................................. 359/81 |
| 5,395,736 | 3/1995 | Grasshoff et al. ....................... 430/270 |

FOREIGN PATENT DOCUMENTS

| WO85/02915 | 7/1985 | WIPO . |
|---|---|---|
| WO94/10606 | 5/1994 | WIPO . |
| WO94/09992 | 5/1994 | WIPO . |
| WO94/10607 | 5/1994 | WIPO . |

*Primary Examiner*—S. Rosasco
*Attorney, Agent, or Firm*—David J. Cole

[57] ABSTRACT

A process for the production of a liquid crystal display device having a color filter comprising:
  providing an assembly comprising, in order, a first support member, a plurality of first electrodes secured to the first support member, a liquid crystal layer, at least one second electrode and a second, substantially transparent support member, the assembly further comprising an imageable layer which, upon exposure to actinic radiation, can form three different colors, this imageable layer being disposed between the first and second support members; and
  exposing the assembly to actinic radiation so as to produce in the imageable layer a plurality of filter elements of first, second and third colors, said filter elements being aligned with the first electrodes, thereby forming a color filter lying between the first and second support members.

20 Claims, 2 Drawing Sheets

PROCESS FOR THE PRODUCTION OF LIQUID CRYSTAL DISPLAY

BACKGROUND OF THE INVENTION

This invention relates to a process for the production of a liquid crystal display device having a color filter. More specifically, this invention relates to such a process which enables the color filter of such a display to be formed after assembly of the display is complete or almost complete. This invention also relates to a second process which enables the formation of an opaque grid in association with an existing color filter.

In recent years, much research has been devoted to liquid crystal display devices, which are now the accepted form of both monochrome and color screens in portable computers and may become the accepted form of screens in desk-top computers because, for a given screen area, they have a much smaller footprint and power requirement than cathode ray tubes.

Although different types of color liquid crystal display devices exist, in general such devices comprises two spaced panels (which may hereinafter be called "support members") which define a sealed cavity filled with a liquid crystal material. A plurality of electrodes are formed on one of the panels and one or more electrodes on the other panel; in the so-called "active matrix" type of display, a single electrode is typically formed on one panel, while the other panel bears a grid of electrodes each of which defines a single pixel of the display. One of the panels carries a color filter containing filter elements of three different colors, typically red, green and blue. Each filter element is aligned with one of the pixels defined by the electrodes and a set of adjacent red, green and blue filter elements is grouped into a triad or other consistent pattern, such as repeating stripes.

Depending upon the image to be displayed, one of more of the electrodes are energized and, depending upon the nature of the liquid crystal material and the level of energization, the transmissivity of the liquid crystal material between the electrodes is altered to allow all light, no light or part of the light to be transmitted through the associated color filter. The user perceives the image as a blending of colors formed by the transmission of light through the various filter elements.

The display may be backlit by providing a light source on the opposite side of the display device from the user. Alternatively, the display device may include a reflective layer on its rear surface and rely upon reflection from a light source located on the same side of the display as the viewer.

The requirements for forming the filter elements on a liquid crystal display device are stringent. A typical 10 inch (254 mm) display (measured diagonally) having a VGA resolution of 640 by 480 pixels requires approximately 80 pixels per inch (about 3.1 per mm) in both directions. A slight misalignment (say 0.2 pixel width, or about 0.06 mm) between the filter elements and the corresponding electrodes will result in changes in color that are readily apparent to the user.

Numerous techniques have been employed to form such color filters, including the use of photoresists, deposition of organic pigments by vacuum evaporation followed by conventional photolithographic lift-off techniques, the use of dyed and patterned stretched film material to create an internal color polarizing filter, and the use of conventional silver halide photosensitive layers. For example, U.S. Pat. No. 4,743,098 describes a liquid crystal display device in which the color filter is formed from polychromatic glass. Through a series of masking, ultraviolet exposure and heat treating steps, red, green and blue areas are formed in the polychromatic glass, which forms one of the support members of the display device.

U.S. Pat. No. 5,229,232 describes the use of a thermal printing system in which various patterned masks are used in conjunction with an electronic flash and other related hardware to thermally transfer dyes to a receiver so as to create a color filter array with an incorporated black matrix for use in a color liquid crystal display device.

U.S. Pat. No. 5,053,298 describes a method of manufacturing a color filter comprising: coating a transparent planarizing layer on a substrate having electrodes formed thereon, the planarizing layer serving to flatten the surface of the substrate; forming on the planarizing layer a first relief pattern overlapping a light receiving region corresponding to a first color in the filter to be formed; coloring this first relief pattern with the first color; forming a medium layer to prevent coloring, this medium layer covering the whole surface of the structure resulting from the coloring step; forming openings to expose the planarizing layer; forming a new relief pattern within the openings, this new relief pattern overlapping another light receiving region corresponding to a second color in the filter to be formed; coloring this relief pattern with a color different from the first color; removing the medium layer; forming colored relief patterns with different colors by successively repeating the steps of forming a medium layer, forming openings, forming a new relief pattern overlapping a light receiving region, coloring the newly formed relief pattern and removing the medium layer; and coating a protective surface over the whole surface of the resultant structure after foraging the colored pattern for the last desired color.

U.S. Pat. No. 5,093,738 describes a method of forming a color filter substrate having pixels of at least two different colors by use of negative photoresist material of the last color deposited. The negative photoresist is coated over the pixels and then exposed to a light source at a wavelength blocked by the formed pixels so that any of the negative photoresist material directly on the transparent substrate is activated by the light from the light source and the remaining photoresist material is thereafter removed.

As will be apparent from the foregoing description, many of the prior art techniques for forming color filters in liquid crystal display devices are complex, multistep procedures susceptible to error, and since these techniques are practiced on devices which have already undergone the complex and expensive procedure for forming the electrodes, any failures in the filter-forming process result in scrapping the expensive electrode assembly. Furthermore, because the prior art techniques require direct access to the filter-forming layer (and in many cases require such access by liquid developing solutions), the filter-forming process must be carried out on an incomplete display device, thus leaving the filter susceptible to damage and/or contamination during the steps necessary to complete the manufacture of the display device.

The present invention provides a process for forming a color filter in a liquid crystal display device which requires only a small number of steps and which can be carried out with the display device completely assembled, thus avoiding any risk that the filter will be damaged or contaminated during later processing or assembly. Preferred forms of the present invention also ensure perfect alignment between the filter elements and the pixels. This invention also provides a process for the formation of an opaque grid in association with an existing color filter.

SUMMARY OF THE INVENTION

Accordingly, this invention provides a process for the production of a liquid crystal display device having a color filter, the process comprising:

providing an assembly comprising, in order, a first support member, a plurality of first electrodes secured to the first support member, a liquid crystal layer, at least one second electrode and a second, substantially transparent support member, the assembly further comprising an imageable layer which, upon exposure to actinic radiation, can form three different colors, this imageable layer being disposed between the first and second support members; and exposing the assembly to actinic radiation so as to produce in the imageable layer a plurality of filter elements of first, second and third colors, said filter elements being aligned with the first electrodes, thereby forming a color filter lying between the first and second support members. (This process may hereinafter be called the "filter production process" of the present invention.)

This invention also provides a process for the production of a liquid crystal display device having a color filter comprising a plurality of filter elements spaced from one another, the display device further comprising an essentially opaque grid covering the spaces between the spaced filter elements, the process comprising:

providing an assembly comprising, in order, a first support member, a plurality of first electrodes secured to the first support member, a liquid crystal layer, at least one second electrode and a second, substantially transparent support member, the assembly further comprising the color filter disposed between the first and second support members and an imageable layer also disposed between the first and second support members, the imageable layer being capable of undergoing a change in opacity upon exposure to actinic radiation; and exposing selected portions of the imageable layer to actinic radiation, thereby leaving portions of the imageable layer aligned with the spaces between the filter elements essentially opaque but the portions of the imageable layer aligned with the filter elements themselves essentially transparent, and thereby forming the grid. (This process may hereinafter be called the "grid production process" of the present invention.)

DETAILED DESCRIPTION OF THE INVENTION

Figure 1:
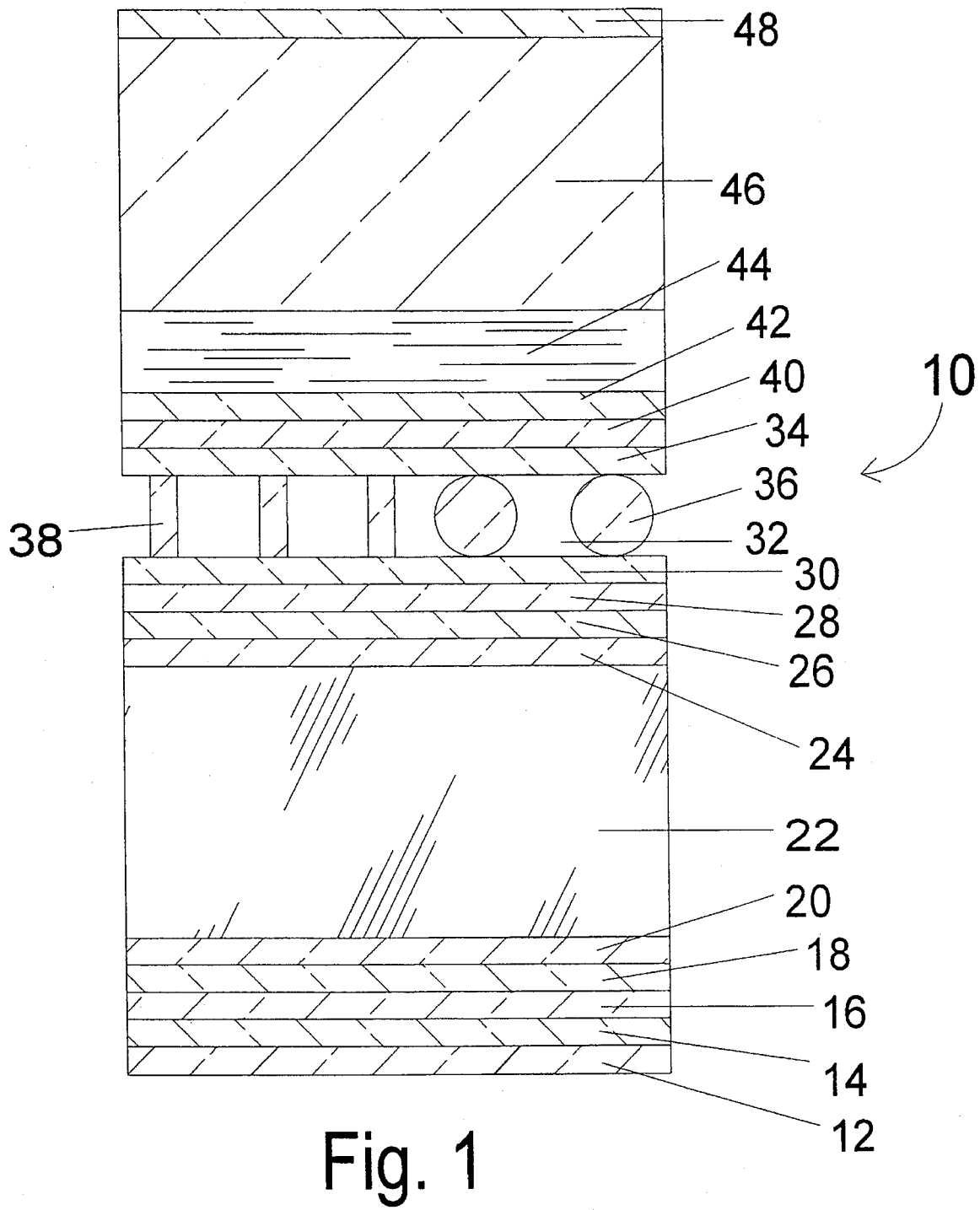
FIG. 1 of the accompanying drawings shows a schematic cross-section through a liquid crystal display device produced by a preferred process of the present invention.

As already mentioned, in the filter production process of the present invention a liquid crystal display device is produced by first forming an assembly comprising a first support member, a plurality of first electrodes secured to the first support member, a liquid crystal layer, at least one second electrode, a second, substantially transparent support member, and an imageable layer. The imageable layer is capable, upon exposure to actinic radiation of one or more wavelengths, of forming three different colors, typically red, green and blue. This assembly comprises all the main components of the final liquid crystal display device except that the color filter is absent and except that, as explained below, certain components of the display device may be added after formation of the color filter. The assembly is then exposed to actinic radiation to produce, in the imageable layer, a plurality of filter elements of the three colors, these filter elements being aligned with the first electrodes, thus forming a color filter lying between the first and second support members. It will be seen that this process overcomes the main disadvantages of the prior art processes discussed above in that only a simple exposure process is required to form the color filter, and this filter is formed in situ between the first and second support members, so that the filter is not susceptible to damage and/or contamination during further processing of the display device following the filter formation.

The imageable layer capable, upon exposure, of forming three colors need not be transparent in its unexposed form, although the use of an initially uncolored imageable layer is convenient in many cases. For example, the specific imageable layer shown in the accompanying drawings has three color-forming sub-layers all of which are initially transparent but which form respectively cyan, magenta and yellow layers upon exposure to appropriate actinic radiation. However, the imageable layer may comprise one or more sub-layers which are colored prior to exposure but which become decolorized upon exposure. For example, to produce a red/green/blue filter, one might use an imageable layer having superimposed red, green and blue sub-layers, which will cause the unexposed imageable layer to appear black. Formation of the required red, green and blue filter elements from such a black imageable layer may be effected by selectively decolorizing the sublayers having the unwanted colors; for example, red filter elements are formed by exposing and thus decolorizing the relevant pans of both the green and blue sub-layers, thereby leaving only the red sub-layer colored.

Although other techniques may be used for exposing the imageable layer if desired, there are two main preferred techniques for carrying out such exposure, both techniques being adapted to align the filter elements formed with the pixels of the display device. In the first preferred technique, a repeating feature of the first electrodes is detected and the exposure to actinic radiation is controlled so that the filter elements are formed in registration with the repeating feature. The repeating feature may be, for example, a feature of the first electrodes in an active matrix type display device. Alternatively, selected pixels of the display device may be rendered non-transmissive and the resulting pixel pattern used as the repeating feature to control the exposure. Thus, in a preferred form of the latter process, a potential difference is applied between selected ones of the first and second electrodes, thereby rendering the liquid crystal between the selected electrodes substantially non-transmissive of radiation and forming a visible pattern in the liquid crystal layer; and thereafter at least one spot of actinic radiation is moved across the imageable layer to form the filter elements while controlling the position of the spot of radiation relative to the pattern in the liquid crystal layer.

In such processes wherein a repeating feature of the first electrodes is detected, it is unnecessary, and sometimes undesirable, to pass the exposing radiation through the liquid crystal layer; thus, the exposure is preferably effected from the face of the display device closer to the imageable layer. In the typical case where the imageable layer is disposed between the liquid crystal layer and the second support member, the exposure is thus preferably effected from the second support member side of the device, that is the front of the display device as the device is normally mounted on a computer or similar apparatus.

The second preferred technique for aligning the filter elements formed by the present process with the first electrodes is to use the liquid crystal layer as light valves to control the exposure of the imageable layer, thus automatically effecting the necessary alignment without needing to detect a repeating feature of the first electrode. Thus, in one preferred process of the present invention, in which the first electrodes are divided into first, second and third sets, filter elements of the three different colors are formed in alignment with the first, second and third sets of the first electrodes by:

applying a potential difference between the second and third sets of first electrodes and the second electrode, thereby rendering the liquid crystal adjacent the second and third sets of first electrodes substantially non-transmissive of radiation;

passing actinic radiation through the first support and the liquid crystal layer, thereby permitting the actinic radiation to pass through the liquid crystal adjacent the first set of first electrodes but not through the liquid crystal adjacent the second and third sets thereof, and thereby effecting an imagewise change in the portions of the imageable layer aligned with the first set of first electrodes;

thereafter, applying a potential difference between the first and third sets of first electrodes and the second electrode, thereby rendering the liquid crystal adjacent the first and third sets of first electrodes substantially non-transmissive of radiation;

passing actinic radiation through the first support and the liquid crystal layer, thereby permitting the actinic radiation to pass through the liquid crystal adjacent the second set of first electrodes but not through the liquid crystal adjacent the first and third sets of first electrodes, and thereby effecting an imagewise change in the portions of the imageable layer aligned with the second set of first electrodes;

thereafter, applying a potential difference between the first and second sets of first electrodes and the second electrode, thereby rendering the liquid crystal adjacent the first and second sets of first electrodes substantially non-transmissive of radiation; and passing actinic radiation through the first support and the liquid crystal layer, thereby permitting the actinic radiation to pass through the liquid crystal adjacent the third set of first electrodes but not through the liquid crystal adjacent the first and second sets of first electrodes, and thereby effecting an imagewise change in the portions of the imageable layer aligned with the third set of first electrodes.

The imagewise changes effected in this process may be the immediate formation of the filter elements of the three different colors. However, in other cases the imagewise changes may only result in the formation of latent images in the imageable layer, with the actual formation of the filter elements not occurring until after certain post-exposure processing steps have been effected. For example, as described below, in the display device shown in the accompanying drawings, the actual exposure steps only result in a non-visible latent image in acid being formed in various sub-layers of the imageable layer, and the colored filter elements appear after post-exposure heating steps.

Obviously, when exposure of the imageable layer is effected using the liquid crystal layer as light shutters, exposure must be effected from the face of the display device on the opposite side of the liquid crystal layer from the imageable layer. Thus, in the typical case where the imageable layer is disposed between the liquid crystal layer and the second support member, the exposure is effected from the face of the display device adjacent the first support member, that is from the back face of the device as the device is normally mounted on a computer or similar apparatus.

In most cases, the present filter formation process also provides for the formation of the black grid or matrix conventionally included in liquid crystal display device to improve the contrast of the display. As described, for example, in the aforementioned U.S. Pat. No. 5,229,232, black grid lines are usually employed to separate adjacent filter elements or pixels from each other to prevent color contamination or light flare, i.e., the unwanted escape of light through the spaces between adjacent pixels through the spaces which have to be left between adjacent first electrodes. Conventionally, the black grid lines are formed in an operation separate from that used to form the filter elements, often by sputtering or otherwise depositing a metal film on to an appropriate layer of the display device. Typically, the imageable layer used in the present process will comprise three sub-layers each capable, upon exposure to appropriate actinic radiation of forming one of the three colors of the filter elements. By exposing all three sub-layers in the areas where the black grid lines are required, these areas will be rendered black, thus forming the grid lines within the imageable layer. For example, when exposure is effected through the liquid crystal layer, provided the spaces between adjacent electrodes transmit radiation, the black grid lines will be formed automatically, since the spaces between adjacent electrodes remain open for the transmission of radiation regardless of the state of the electrodes, so that each of the three exposures will expose the portions of the imageable layer overlying the spaces, thereby rendering these portions black and automatically forming black grid lines aligned with the spaces. Even when exposure is not effected through the liquid crystal layer, the exposure can be controlled so that all three sub-layers are exposed in the portions overlying the spaces, thereby rendering these portions black and forming black grid lines aligned with the spaces.

The imageable layer used in the present processes may be of any type that permits development of color within the imageable layer while this layer is positioned between the first and second support members. In saying that the exposure of the assembly to the actinic radiation produces in the imageable layer filter elements of the first, second and third colors, or grid lines, as already indicated I do not exclude the possibility that steps in addition to the exposure to actinic radiation may be required to complete the development of color and thus the formation of the filter elements, provided that such additional steps can be carried out with the imageable layer still positioned between the second electrode(s) and the second support member. Thus, the imageable layer cannot be of a type (for example, silver halide) which requires intimate contact with a liquid developer after exposure to cause the formation of color. However, as mentioned below, the imageable layer may be of a type which requires heating and/or auxiliary exposure steps after the exposure to actinic radiation, since such heating and/or auxiliary exposure steps can be carried out with the imageable layer still positioned between the second electrode(s) and the second support member. In general, it is advantageous to use an imageable layer of a type which is sufficiently insensitive to visible radiation to permit the assembly to be handled in normal room lighting for several minutes, since such imageable layers permit the assembly to be handled and the exposure to actinic radiation carried out without the inconvenience of working in darkness.

Preferred forms of imageable layer for use in the present processes comprise a radiation absorber capable of absorbing actinic radiation and a leuco dye which, upon absorption of radiation by the radiation absorber, forms the colored material; this type of imageable layer has the advantage that the leuco dye can be selected for its color-forming properties without regard to its absorption at the particular wavelength at which it is desired to expose the imageable layer, while the radiation absorber can be chosen to have maximum absorption at the desired wavelength. In one type of such imageable layer described, for example, in the aforementioned U.S. Pat. Nos. 4,602,263; 4,720,449; 4,720,450; 4,745,046; 4,818,742; 4,826,976; 4,839,335; 4,894,358 and 4,960,901, the radiation absorber generates heat within the imageable layer, and the leuco dye undergoes a thermal reaction to form the colored material. In this type of composition, the leuco dye may be, for example:

a. an organic compound capable of undergoing, upon heating, an irreversible unimolecular fragmentation of at least one thermally unstable carbamate moiety, this organic compound initially absorbing radiation in the visible or the non-visible region of the electromagnetic spectrum, the unimolecular fragmentation visibly changing the appearance of the organic compound (see U.S. Pat. No. 4,602,263);

b. a substantially colorless di- or triarylmethane imaging compound possessing within its di- or triarylmethane structure an aryl group substituted in the ortho position to the meso carbon atom with a moiety ring-closed on the meso carbon atom to form a 5- or 6-membered ring, the moiety possessing a nitrogen atom bonded directly to the meso carbon atom and the nitrogen atom being bound to a group with a masked acyl substituent that undergoes fragmentation upon heating to liberate the acyl group for effecting intramolecular acylation of the nitrogen atom to form a new group in the ortho position that cannot bond to the meso carbon atom, whereby the di- or triarylmethane compound is rendered colored (see U.S. Pat. No. 4,720,449);

c. a colored di- or triarylmethane imaging compound possessing within its di- or triarylmethane structure an aryl group substituted in the ortho position to the meso carbon atom with a thermally unstable urea moiety, the urea moiety undergoing a unimolecular fragmentation reaction upon heating to provide a new group in the ortho position that bonds to the meso carbon atom to form a ring having 5 or 6 members, whereby the di- or triarylmethane compound becomes ring-closed and rendered colorless (see U.S. Pat. No. 4,720,450);

d. in combination, a substantially colorless di- or triarylmethane compound possessing on the meso carbon atom within its di- or triarylmethane structure an aryl group substituted in the ortho position with a nucleophilic moiety which is ring-closed on the meso carbon atom, and an electrophilic reagent which upon heating and contacting the di- or triarylmethane compound undergoes a bimolecular nucleophilic substitution reaction with the nucleophilic moiety to form a colored, ring-opened di- or triarylmethane compound (see U.S. Pat. No. 4,745,046);

e. a compound of the formula

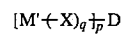

wherein M' has the formula:

wherein R is alkyl; —SO$_2$R$^1$ wherein R$^1$ is alkyl; phenyl; naphthyl; or phenyl substituted with alkyl, alkoxy, halo, trifluoromethyl, cyano, nitro, carboxyl, —CONR$^2$R$^3$ wherein R$^2$ and R$^3$ each are hydrogen or alkyl, —CO$_2$R$^4$ wherein R$^4$ is alkyl or phenyl, —COR$^5$ wherein R$^5$ is amino, alkyl or phenyl, —NR$^6$R$^7$ wherein R$^6$ and R$^7$ each are hydrogen or alkyl, —SO$_2$NR$^8$R$^9$ wherein R$^8$ and R$^9$ each are hydrogen, alkyl or benzyl; Z' has the formula:

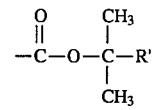

wherein R' is halomethyl or alkyl; X is —N=, —SO$_2$— or —CH$_2$—; D taken with X and M' represents the radical of a color-shifted organic dye; q is 0 or 1; and p is a whole number of at least 1; Z' being removed from M' upon the application of heat to effect a visually discernible change in spectral absorption characteristics of the dye (see U.S. Pat. No. 4,826,976);

f. a substantially colorless di- or triarylmethane compound of the formula:

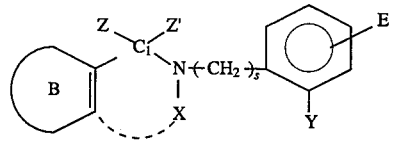

wherein ring B represents a carbocyclic aryl ring or a heterocyclic aryl ring; C$_1$ represents the meso carbon atom of the di- or triarylmethane compound; X represents —C(=O)—; —SO$_2$— or —CH$_2$— and completes a moiety ring-closed on the meso carbon atom, the moiety including the nitrogen atom bonded directly to the meso carbon atom; Y represents —NH—C(=O)—L, wherein L is a leaving group that departs upon thermal fragmentation to unmask —N=C=O for effecting intramolecular acylation of the nitrogen atom to open the N-containing ring and form a new group in the ortho position of ring B that cannot bond to the meso carbon atom; E is hydrogen, an electron-donating group, an electron-withdrawing group or a group, either an electron-donating group or an electron-neutral group that undergoes fragmentation upon heating to liberate an electron-withdrawing group; s is 0 or 1; and Z and Z' taken individually represent the moieties to complete the auxochromic system of a diarylmethane or triarylmethane dye when the N-containing ring is open, and Z and Z' taken together represent the bridged moieties to complete the auxochromic system of a bridged triarylmethane dye when the N-containing ring is open (see U.S. Pat. No. 4,960,901);

g. a colorless precursor of a preformed image dye substituted with (a) at least one thermally removable protecting group that undergoes fragmentation from the precursor upon heating and (b) at least one leaving group that is irreversibly eliminated from the precursor upon heating, provided that neither the protecting group nor the leaving group is hydrogen, the protecting and leaving groups maintaining the precursor in its colorless form until heat is applied to effect removal of the protecting and leaving groups whereby the colorless precursor is converted to an image dye;

h. a mixed carbonate ester of a quinophthalone dye and a tertiary alkanol containing not more than about 9 carbon atoms (see U.S. Pat. No. 5,243,052); or i. a leuco dye represented by:

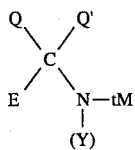

wherein:

E represents a thermally removable leaving group;

tM represents a thermally migratable acyl group;

Q, Q' and C taken together represent a dye-forming coupler moiety wherein C is the coupling carbon of the coupler moiety;

and, (Y) taken together with N represents an aromatic amino color developer, one of Q, Q' and (Y) containing an atom selected from the atoms comprising Group 5A/Group 6A of the Periodic Table, the groups E and tM maintaining the leuco dye in a substantially colorless form until the application of heat causes the group E to be eliminated from the leuco dye and the group tM to migrate from the N atom to the Group 5A/Group 6A atom thereby forming a dye represented by:

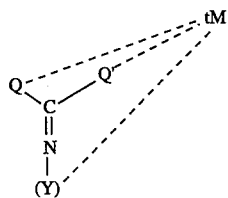

wherein the dotted lines indicate that the tM group is bonded to the Group 5A/Group 6A atom in one of Q, Q' and (Y) (see U.S. Pat. No. 5,236,884).

Another preferred type of imageable layer for use in the present processes is that described in U.S. Pat. Nos. 5,278,031, 5,286,612 and 5,334,489, copending application Ser. No. 08/141,852 (now U.S. Pat. No. 5,453,345); U.S. Pat. No. 5,395,736; and in the corresponding International Applications Nos. PCT/US93/10093, PCT/US93/10224 and PCT/US93/10215 (Publication Nos. WO 94/09992, WO 94/10607 and WO 94/10606 respectively); in this type of imageable layer, upon absorption of the actinic radiation, the radiation absorber generates acid within the imageable layer, and, upon exposure to this acid, the leuco dye forms the colored material. The acid may be generated by direct thermal breakdown of an acid generating material, for example a squaric acid derivative or a sulfonate (see International Application No. PCT/US93/10093), or by direct decomposition of a superacid precursor by actinic (typically ultra-violet) radiation followed by "amplification" of the superacid produced by superacid-catalyzed thermal decomposition of a secondary acid generator (see U.S. Pat. No. 5,395,736). Alteratively, (see International Application No. PCT/US93/10215), the color-forming composition may comprise a superacid precursor capable of being decomposed, by radiation of a wavelength shorter than that of the actinic radiation absorbed by the radiation absorber, to form a superacid, the superacid precursor, in the absence of the radiation absorber, not being decomposed by the actinic radiation absorbed by the radiation absorber but, in the presence of the radiation absorber and the actinic radiation absorbed by the radiation absorber, decomposing to form a protonated product derived from the radiation absorber, the color-forming composition further comprising a secondary acid generator capable of being thermally decomposed to form a second acid, the thermal decomposition of the secondary acid generator being catalyzed in the presence of the superacid derived from the superacid precursor. This type of medium is first imagewise exposed to radiation (typically infra-red radiation) of a wavelength which is absorbed by the radiation absorber, thereby producing, in the exposed regions, a protonated product derived from the absorber; in effect, the absorber causes decomposition of the superacid precursor with the formation of superacid buffered by the dye. The medium is then given a second exposure to radiation (typically ultra-violet radiation) of a wavelength which causes decomposition of the superacid precursor. The second exposure is controlled so that in the areas exposed during the first exposure, unbuffered superacid is present after the second exposure, whereas in the areas not exposed during the first exposure, only buffered superacid is present following the second exposure. Thus, the double exposure effectively produces an image in unbuffered superacid. Following the second exposure, the imaging medium is heated so that the unbuffered superacid can catalyze the thermal breakdown of a secondary acid generator, thereby producing, in the areas exposed during the first exposure, a large concentration of a secondary acid, which produces color in an acid-sensitive leuco dye.

Another preferred type of imageable layer for use in the present processes is that described in copending application Ser. No. 08/232,725, filed Apr. 25, 1994 (now U.S. Pat. No. 5,441,850) and assigned to the same assignee as the present application. This imageable layer is similar to those described in the aforementioned U.S. Pat. No. 5,286,612, copending application Ser. No. 08/141,852 (now U.S. Pat. No. 5,453,345), and International Application No. PCT/US93/10215 (Publication No. WO 94/10606) but uses a radiation absorber having an unprotonated form and a protonated form, the protonated form having substantially greater substantial absorption in the first wavelength range than the unprotonated form. The imageable layer comprises an acid-generating layer or phase comprising the superacid precursor, radiation absorber and secondary acid generator and a color-change layer containing the leuco dye. While at least part of the radiation absorber is in its protonated form, the medium is imagewise exposed to actinic radiation in the first wavelength range. In the exposed areas of the acid-generating layer or phase, this imagewise exposure causes the radiation absorber to decompose at least part of the superacid precursor, with formation of unbuffered superacid. Thereafter, the medium is heated to cause, in the exposed areas of the acid-generating layer or phase, acid-catalyzed thermal decomposition of the secondary acid generator and formation of the second acid. Next, the components of the acid-generating and color-change layers or phases are mixed, thereby causing, in the exposed areas of the medium, the second acid to bring about the change in absorption of the leuco dye and thereby form the desired filter element. Finally, there is introduced, into the non-exposed areas of the medium, sufficient base to restore the radiation absorber to its unprotonated form. This type of imageable layer has the advantage that, since at the conclusion of the process, the radiation absorber is in its deprotonated form that has low absorption at the wavelength of the imagewise exposure, the radiation absorber contributes little or nothing to the final color of the filter elements.

One particular form of medium described in the aforementioned copending application Ser. No. 08/232,725 now U.S. Pat. No. 5,441,850 may be especially useful as the imageable layer in the present filter formation process because it permits filter elements of the three colors to be obtained with imagewise exposures at only one wavelength. This medium comprises:

a first acid-generating layer comprising a radiation absorber in its protonated form, a superacid precursor and a secondary acid generator;

a first color-change layer disposed adjacent the first acid-generating layer and comprising a base and a first leuco dye undergoing a change in its absorption of radiation upon contact with the secondary acid generated upon acid-catalyzed decomposition of the secondary acid generator in the first acid-generating layer;

a first acid-resistant interlayer superposed on the first acid-generating layer and the first color-change layer;

a second acid-generating layer disposed on the opposed side of the first acid-resistant interlayer from the first acid-generating layer and the first color-change layer, the second acid-generating layer comprising a radiation absorber in its unprotonated form, a superacid precursor and a secondary acid generator, the second acid-generating layer further comprising a first auxiliary sensitizer which renders the superacid precursor therein susceptible to decomposition by actinic radiation of a first wavelength in the second wavelength range, but not susceptible to decomposition by actinic radiation of a second wavelength in the second wavelength range;

a second color-change layer disposed adjacent the second acid-generating layer and on the opposed side of the first acid-resistant interlayer from the first acid-generating layer and the first color-change layer, the second color-change layer comprising a base and a second leuco dye undergoing a change in its absorption of radiation upon contact with the secondary acid generated upon acid-catalyzed decomposition of the secondary acid generator in the second acid-generating layer, the absorption change undergone by the second leuco dye being different from that undergone by the first leuco dye;

a second acid-resistant interlayer disposed on the opposed side of the second acid-generating layer and second color-change layer from the first acid-resistant interlayer;

a third acid-generating layer disposed on the opposed side of the second acid-resistant interlayer from the second acid-generating layer and second color-change layer, the third acid-generating layer comprising a radiation absorber in its unprotonated form, a superacid precursor and a secondary acid generator, the third acid-generating layer further comprising a second auxiliary sensitizer which renders the superacid precursor therein susceptible to decomposition by actinic radiation of the second wavelength in the second wavelength range, but not susceptible to decomposition by actinic radiation of the first wavelength in the second wavelength range; and a third color-change layer disposed adjacent the third acid-generating layer and on the opposed side of the second acid-resistant interlayer from the second acid-generating layer and the second color-change layer, the third color-change layer comprising a base and a third leuco dye undergoing a change in its absorption of radiation upon contact with the second acid generated upon acid-catalyzed decomposition of the secondary acid generator in the third acid-generating layer, the absorption change undergone by the third leuco dye being different from those undergone by the first and second leuco dyes. Very conveniently, in this preferred form of imaging medium, the same radiation absorber, superacid precursor and secondary acid generator are present in each of the three acid-generating layers.

This type of imaging medium is imaged in the following manner. First, the medium is imagewise exposed, from the surface closer to the third acid-generating layer, to actinic radiation in the first wavelength range, thereby causing, in the exposed areas of the first acid-generating layer or phase, the radiation absorber to decompose at least part of the superacid precursor, with formation of unbuffered superacid in the first acid-generating layer, without substantial production of unbuffered superacid in the second and third acid-generating layers. Thereafter, the whole imaging medium is exposed to radiation of the first wavelength in the second wavelength range, thus decomposing part of the superacid precursor in the second acid-generating layer to produce superacid and converting at least part of the radiation absorber in the second acid-generating layer to its protonated form, without substantial production of superacid in the third acid-generating layer. The medium is then imagewise exposed to actinic radiation in the first wavelength range, thus causing, in the exposed areas of the second acid-generating layer or phase, the radiation absorber to decompose at least part of the superacid precursor, with formation of unbuffered superacid in the second acid-generating layer, without substantial production of unbuffered superacid in the first and third acid-generating layers. Thereafter, the whole imaging medium is exposed to radiation of the second wavelength in the second wavelength range, thus decomposing part of the superacid precursor in the third acid-generating layer to produce superacid and converting at least part of the radiation absorber in the third acid-generating layer to its protonated form. The medium is then imagewise exposed to actinic radiation in the first wavelength range, thus causing, in the exposed areas of the third acid-generating layer or phase, the radiation absorber to decompose at least part of the superacid precursor, with formation of unbuffered superacid in the third acid-generating layer, without substantial production of unbuffered superacid in the first and second acid-generating layers. The last two stages of the imaging process are heating the medium to cause, in the exposed areas of the first, second and third acid-generating layers, acid-catalyzed thermal decomposition of the secondary acid generator and formation of the secondary acid, and admixing the components of the first acid-generating layer with those of the first color-change layer, the components of the second acid-generating layer with those of the second color-change layer, and the components of the third acid-generating layer with those of the third color-change layer, thus causing, in the areas of the medium exposed to the three imagewise exposures, the secondary acids to bring about the changes in absorption of the first, second and third leuco dyes and thus form a trichrome image.

The first and second support members of the assembly used in the present process may be of the conventional type using planarized (plane-parallel) glass. However, to reduce the cost of the support members it is preferred that one or both support members be formed from a sheet of plastic, as described in U.S. Pat. No. 4,674,840. In an especially preferred embodiment of the invention, the first support member is formed from a sheet of non-planarized glass, while the second support member is formed from a sheet of plastic, preferably polyester. The flexibility of the plastic second support member accommodates the irregularities in the non-planarized glass without substantial variation in the thickness of the liquid crystal layer, while the formation of the color filter after the two support members have been placed into the assembly ensures precise alignment of the filter elements with the electrodes despite deviations from planarity in the liquid crystal layer.

As is well known to those skilled in forming liquid crystal display devices, such devices require two polarizing layers having orthogonal directions of polarization to enable the liquid crystal layer to control the transmission of light through the device. Conventionally, the two polarizing layers are provided on the outside surfaces of the device. When glass support members are used, the presence of the support members between the polarizing layers and the liquid crystal layer presents no problems, since glass is optically isotropic. However, as discussed in the aforementioned U.S. Pat. No. 4,674,840, when one or both of the support members are formed of plastic, even slight birefringence in the relatively thick support member(s), and the polarization associated with such birefringence, adversely affects the performance of the display device. Accordingly, with a plastic support member exhibiting birefringence, it is desirably to position the associated polarizing layer between the support member and the adjacent electrode(s). In particular, in the preferred embodiment of the invention in which the first support member is formed of non-planarized glass and the second support member is formed of plastic, it is desirable that a polarizing layer be disposed between the second support member and the second electrode. A preferred type of polarizing layer is a linear dichroic polarizing layer comprising a stretched poly(vinyl alcohol) sheet containing polyvinylene light polarizing species, such as may be provided by hydrochloric acid vapor processing in known manner. Preferably, such polarizing material will be borated for additional stability. Methods for the preparation of such polarizing materials are described in U.S. Pat. No. 2,445,555. The polarizing material may be silylated by organosilylation treatment against humidity and heat, as described in U.S. Pat. No. 4,759,611; as described in detail in this patent, such silylation reduces changes in the physical appearance and conductivity of electroconductive materials used in the display devices, and thus improves the operating life of the devices.

The liquid crystal display devices produced by the present processes may be of the single scan passive matrix type (in which there is a plurality of first electrodes and a plurality of second electrodes, the electrodes in each set being parallel and elongate, and extending orthogonally to the electrodes in the other set), of the dual scan passive matrix type (which is similar to the single scan passive matrix type except that one set of electrodes is divided into two sub-sets so that the elongate electrodes in each sub-set extend only half of the screen dimension) or of the active matrix type (in which a separate first electrode is provided for each pixel of the display and normally only one second electrode is present).

Although the foregoing description has been principally concerned with the filter formation process of the invention, it will be appreciated that the grid formation process of the invention may carried out in a very similar manner, using essentially the same color-forming materials and exposure techniques, except that instead of forming sets of filter elements of differing colors aligned with the first electrodes, only a single opaque grid is formed in alignment with the spaces between the pixels. In the grid formation process of the invention, a color filter may be formed by any convenient technique, not only the filter formation process of the present invention.

In a preferred variant of the grid formation process, the parts of the liquid crystal layer adjacent all the filter elements are rendered substantially opaque to radiation, and the actinic radiation is passed through the liquid crystal layer, so that exposure of the imageable layer only occurs in parts of the imageable layer aligned with the spaces between the filter elements, thereby rendering these parts of the imageable layer substantially opaque and thereby forming the grid.

FIG. 1 of the accompanying drawings shows a schematic cross-section through a liquid crystal display device (generally designated 10) produced by the filter formation process of the present invention. In FIG. 1, for ease of illustration, the thicknesses of the various layers are greatly exaggerated relative to their widths, and the relative thicknesses of the layers are not strictly to scale. The display device is intended to be viewed from above in FIG. 1.

The liquid crystal display device 10 comprises a first protective layer 12, a first polarizing layer 14 and a second protective layer 16. The protective layers 12 and 16 are formed from a triacetate polymer and serve to protect the polarizing layer 14, which is formed from a stretched (oriented) poly(vinyl alcohol) film about 1 mil (0.025 min.) thick stained according to known methods with a dichroic dye such as iodine. Such a polarizing material will also preferably be borated for improved stability. Suitable polarizing layers of this type can be prepared using methods set forth in U.S. Pat. No. RE. 23,297 and U.S. Pat. No. 4,166,871. The protective layers 12 and 16 and the polarizing layer 14 are produced commercially in the form of a composite polarizing film which can be applied to the first support member after the other components of the display device have been assembled and the color filter formed, as described below.

The layers 12, 14 and 16 are secured by means of a layer of pressure-sensitive adhesive 18 to a sodium barrier film 20 provided on the rear surface of a plate 22 of non-planarized glass, which forms the first support member of the display device. In practice, the display device is normally assembled with the sodium barrier film 20 covered with a temporary protective film (not shown) which protects the sodium barrier film 20 and the glass plate 22 from contamination during production of the main pans of the display device 10, but which is then peeled off to leave a clean surface on the sodium barrier film 20 ready to receive the layers 12, 14, 16 and 18. The front surface of the glass plate 22 is provided with a second sodium barrier film 24, which serves to prevent migration of sodium ions from the glass into the first electrodes described below. (The second sodium barrier film 24 can often be omitted when the display device 10 is of the active matrix type.)

The display device 10 is of the active matrix type having a grid of first electrodes, one for each pixel of the display, and a single second electrode. To provide the first electrodes, on the second sodium barrier film 24 are deposited a silicon nitride insulator layer 26 and an indium tin oxide electrode layer 28, which is etched in a grid pattern to form the first electrodes. Those skilled in the technology of liquid crystal displays will appreciate that the electrode layer of indium tin oxide may be replaced by a layer of any conventional metal or metal oxide material including silver, gold, indium oxide, or the like applied by any conventional method including vapor deposition, magnetron sputtering, or by bombardment by a plasma generator or the like. A polyimide orientation layer 30 is provided on the front surface of the electrode layer 28; this orientation layer 30 serves the conventional functions of helping to orient the liquid crystal material and to protect the first electrodes from the liquid crystal material. (Instead of polyimide, the orientation layer 30 may be formed of may be of any conventional alignment material, which may be by preferential coating, by vapor deposition, or other processes.) The alignment layer 30 can include $SiO_2$ deposited by preferential vapor deposition or a polyamide layer that is subsequently rubbed or buffed to establish an orientation in the desired direction. The alignment layer 30 may be of poly(vinyl alcohol), for example, and approximately 500 Å in thickness. Other suitable alignment materials include polyvinylidene chloride, polyvinyl acetal and the fluorinated polymers Adjacent the alignment layer 30 is provided a liquid crystal layer 32, which is confined between the alignment layer 30 and a second alignment layer 34, which is generally similar to the layer 30. The edges of the liquid crystal layer 32 are confined by a seal (not shown) which extends around the periphery of the support members and has a rectangular form with length and width dimensions that define the area of the liquid crystal layer. The seal can be fabricated from one of several known materials including a heat-activatable, or pressure-sensitive or radiation-curable adhesive. Suitable adhesives include polyamide, polyester, polyurethane and polyvinyl adhesives that can be preprinted and then brought into contact and adhered to one another. A preferred seal adhesive is a heat-activatable mixture of polyester and polyvinyl adhesive compounds.

In general, the liquid crystal layer 32 will be approximately 5 to 50 μm in thickness with 8–12 μm being typical. The liquid crystal material can be of any conventional composition. Good results can be obtained, for example, using a liquid crystal material of the known twisted nematic type. The liquid crystal material may include adjuncts such as pleochroic dyes or the like. If desired, the liquid crystal display can be sealed and simultaneously filled using the process described in International Patent Application. No. PCT/US84/02040, Publication No. WO 85/02915.

Spacers are incorporated into the area occupied by the liquid crystal layer 32 to assist in maintaining the thickness of the liquid crystal material. These spacers can have the form of rods, fibers or beads (indicated at 36 in FIG. 1) admixed with the liquid crystal material or may be in the form of printed polymeric spacers (indicated at 38 in FIG. 1) printed by lithographic, gravure or screen printing of, for example, a hot-melt polyamide or UV-curable acrylate on to alignment layer 30. Suitable spacers and their application are described in the aforementioned International Patent Application. No. PCT/US84/02040.

On the opposed side of the second alignment layer 34 from the liquid crystal layer 32 is disposed the second electrode 40. Although any of the conventional electrode materials discussed above can be used as the second electrode 40, preferably this second electrode comprises a titania/silver/titania or titania/silver/gold/titiania arrangement of layers that can be suitably deposited by vacuum deposition techniques. Preferably, the silver layer will contain a minor amount of gold, platinum or like metal to provide environmental stability. A web of polyester can be passed in a series of passes over vapors of titania, silver, and titania, respectively, so as to deposit the desired layers.

The next layer of the device shown in FIG. 1 is a second polarizing layer 42. The device 10 has a second support member 46 (described below) formed of a polymeric material and, for the reasons explained above and in the aforementioned U.S. Pat. No. 4,674,840, when a polymeric support member is employed, it is desirable to position the associated polarizing layer "inboard" of the support member (i.e., between the support member and the liquid crystal layer) lest any polarization of light caused by birefringence in the polymeric support member interfere with the polarization of light by the polarizing layer and reduce the efficiency of the display device. The second polarizing layer 42 is preferably formed from a stretched poly(vinyl alcohol) sheet containing polyvinylene light polarizing species, such as may be provided by hydrochloric acid vapor processing, since such materials are less likely to leak undesirable materials into the electrode or liquid crystal layers than, for example, an iodine-stained polarizing layer. (As already described, the display device 10 shown in FIGS. 1 and 2 has its first polarizing layer 14 disposed outboard of the first support member 22 and formed from a stretched PVA film dyed with a dichroic dye, and a second polarizing layer 42 inboard of the second support member 46 and formed from a stretched PVA film containing polyvinylene light polarizing species, and this is typically the preferred combination of polarizing layers for use in the present display device. However, depending upon the nature of the two support members used, for example whether a given support member is glass or plastic, and if the latter whether the plastic is birefringent, each polarizing layer may be inboard or outboard, and each may be of the type containing a dichroic dye or of the type containing polyvinylene light polarizing species.)

Adjacent the second polarizing layer 42 lies the imageable layer 44, which is of the type described in the aforementioned copending application Serial No. 08/232,725 now U.S. Pat. No. 5,441,850, and which is described in detail below with reference to FIG. 2.

The last two layers of the display device 10 are the second support member 46 and an antireflection coating 48. The second support member 46 is formed of a transparent or translucent polyester such as poly(ethylene terephthalate), desirably in the form of a flexible sheet material, since the flexibility of the polyester allows the second support member 46 to conform to the irregularities on the surface of the non-planarized glass forming the first support member 22. Polyesters are especially useful from the standpoints of low cost and ready availability and ease of handling in manufacture. Suitable poly(ethylene terephthalate) film for forming the second support member is available from ICI Americas, Inc., Wilmington, Del. under the trademark Mylar. One especially preferred material for forming the support member 22 is that sold by ICI Americas, Inc. under the registered trade mark Kaladex; this material can be processed at substantially higher temperatures than other polyesters and thus is especially useful where the type of imageable layer used requires a heating step in the imaging process. Alternative materials for forming the second support member 46 include cellulose esters such as nitrocellulose, cellulose acetate or cellulose acetate butyrate, polyesters, polycarbonates, vinyl polymers such as acrylics, or other polymers that can be provided in a sheet-like light transmissive form. Preferably the second support member 46 has a thickness of approximately 7 mil (0.178 mm).

The antireflection coating 48 serves to reduce glare from the display device, thus improving ease of viewing an image on the device. A preferred material for use in this coating is a low refractive index fluorinated polymer, preferably coated at a quarter wave optical thickness for visible light. Suitable fluorinated polymers and methods for their application to polyester substrate materials are described in detail in U.S. Pat. No. 4,066,814.

The display device 10 shown in FIG. 1 is intended to be backlit and for this purpose will be mounted with the protective layer 12 forming one wall of a light box containing a source of illumination, conveniently a fluorescent panel. If, however, a reflective rather than backlit display device is desired, a diffusely reflective layer may be coated on the exposed surface of the protective layer 12 (i.e., on the lower surface of this layer as shown in FIG. 1).

Figure 2:
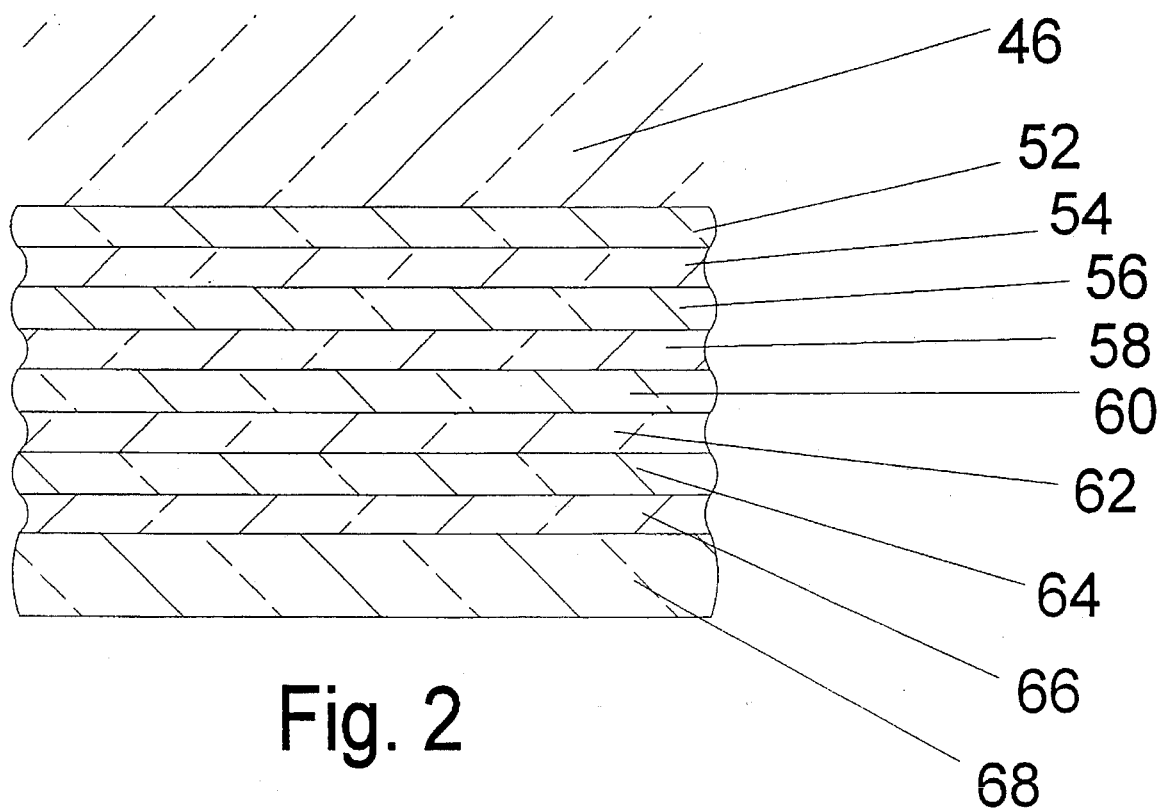
FIG. 2 shows a schematic cross-section through the imageable layer of the display device shown in FIG. 1.

FIG. 2 shows part of the imageable layer 44 together with part of the second support member 46. The various sub-layers of the imageable layer 44 (these sub-layers may hereinafter be referred to simply as "layers" for convenience) are, in the device 10, shown coated directly on to the support member 46; however, if such direct coating is not convenient, the sub-layers may be coated on to a thin plastic film which can then be laminated or adhered to the support member 46. When direct coating of the imageable layer on to the support member 46 is effected, desirably the support member is treated with a sub-coat, such as are well known to those skilled in the preparation of imaging media, to improve adhesion of the imageable layer to the support member.

Directly on the support member 46 is disposed a first acid-generating layer 52 comprising:

(a) a superacid precursor, namely (4-octyloxyphenyl)phenyliodonium hexafluoroantimonate;

(b) an indicator sensitizing dye of the formula:

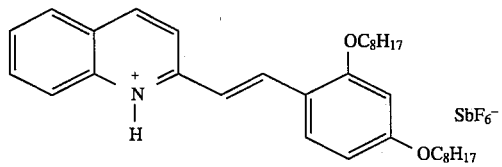

(the unprotonated form is available from Yamada Chemicals, Kyoto, Japan); this sensitizing dye sensitizes the superacid precursor to visible radiation at approximately 450 nm);

(c) a secondary acid generator, which undergoes a superacid-catalyzed thermal decomposition to form a second acid, this secondary acid generator being of the formula:

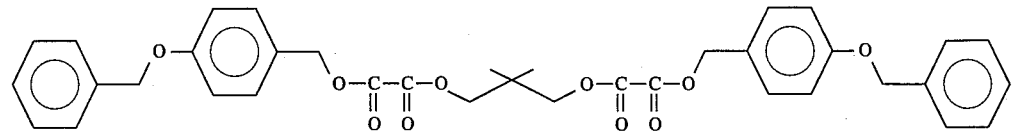

and (d) a polystyrene binder.

On the opposed side of the acid-generating layer 52 from the second support member 46 is disposed a first color-change layer 54 comprising:

(a) a first image dye of the formula:

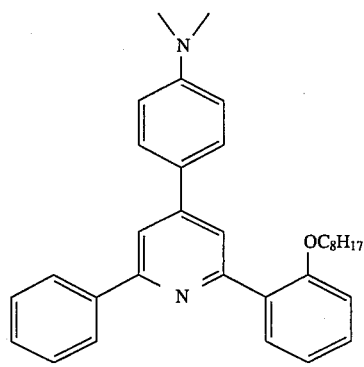

(available from Hilton Davis Co., 2235 Langdon Farm Road, Cincinnati, Ohio 45237 under the tradename "Copikem 37"), which changes from colorless to yellow in the presence of an acid;

(b) copper(II) acetate;

(c) a base, namely potassium acetate; and (d) a binder comprising Acryloid B82 (available from Rohm & Haas, Philadelphia, Pa. 19104) and poly(vinyl alcohol); the poly(vinyl alcohol) acts as both a binder and a reducing agent for the fixing process.

The acid-generating layer 52 and the color-change layer 54 both contain a binder having a glass transition temperature substantially above room temperature.

Superposed on the first color-change layer 54 is an acid-impermeable layer 56, which serves to prevent acid generated in the second acid-generating layer 58 (see below) during imaging penetrating to the first color-change layer 54. Superposed on the acid-impermeable layer 56 is a second acid-generating layer 58, which contains the same superacid precursor, secondary acid generator and binder as the first acid-generating layer 52. However, the second acid-generating layer 58 contains, in its protonated form, as an indicator sensitizing dye, 2,4,6-tris(2,4-dimethoxyphenyl)pyridine, which sensitizes the superacid precursor to visible/near ultra-violet radiation of approximately 400 nm wavelength.

Superposed on the second acid-generating layer 58 is a second color-change layer 60, which is identical to the first color-change layer, except that the Copikem 37 is replaced by a second image dye, of the formula:

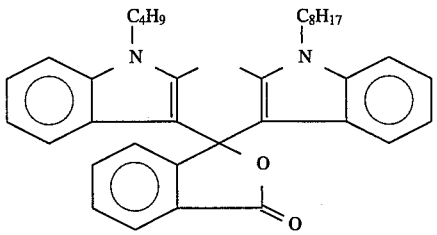

(available from Hilton Davis Co. under the tradename "Copikem 35"), which changes from colorless to magenta in the presence of an acid.

The next layer of the imaging medium is a second acid-impermeable interlayer 62, identical to the layer 56. Superposed on the acid-impermeable layer 62 is a third acid-generating layer 64, which contains the same superacid precursor, secondary acid generator and binder as the first and second acid-generating layers 52 and 58 respectively. However, this third acid-generating layer 64 does not contain an indicator sensitizing dye, but instead contains a conventional non-basic polycyclic aromatic sensitizer, namely 1-vinylpyrene, which sensitizes the superacid precursor to ultra-violet radiation of approximately 350 nm wavelength. Superposed on the third acid-generating layer 64 is a third color-change layer 66, which is identical to the first color-change layer 54, except that the Copikem 37 is replaced by a third image dye, of the formula:

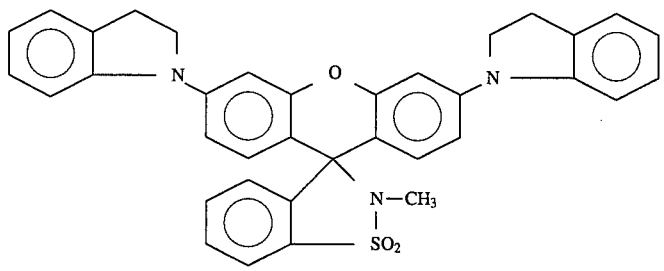

which changes from colorless to cyan in the presence of an acid. Finally, the imageable layer 44 comprises a topcoat 68, which isolates the acid-generating and color change layers from the second polarizing layer 42.

The display device shown in FIG. 1 is preferably produced in the following manner. All the various components of the device are assembled in the conventional manner, with the liquid crystal layer 32 in position and the first and second electrodes connected to their control device (not shown) and to a source of electrical power. For the purposes of the present filter formation invention, the first electrodes may be divided into first, second and third sets, these sets being those which will eventually be aligned with red, green and blue respectively filter elements. In the first step of the process, the control device is set so that the third set of first electrodes are "on" and consequently the portions of the liquid crystal layer 32 adjacent this third set of first electrodes are opaque. The display device 10 is then illuminated, through the surface bearing the first polarizing layer 14, with a collimated beam of blue visible radiation having a wavelength of approximately 450 nm. Since the portion of the liquid crystal layer 32 adjacent the first and second sets of first electrodes is still transparent, the 450 nm radiation passes through these portions of the liquid crystal layer 32 and forms acid in the first acid-generating layer 52 producing in this layer a latent image in superacid corresponding to the red and green filter elements to be formed. Next, the second set of first electrodes are switched on, and the display device 10 is illuminated, through the surface bearing the first polarizing layer 14, with a collimated beam of violet visible radiation having a wavelength of approximately 400 nm, thus forming, in the second acid-generating layer 58, a latent image in superacid of the red and blue filter elements to be formed. Finally, the first set of first electrodes are switched on, and the display device 10 is illuminated, through the surface bearing the first polarizing layer 14, with a collimated beam of ultraviolet radiation having a wavelength of approximately 350 nm, thus forming, in the third acid-generating layer 64, a latent image in superacid of the green and blue filter elements to be formed.

Following these three exposures, the device 10 is heated, thus causing the superacid present in the exposed areas of the acid-generating layers 52, 58 and 64 to bring about catalytic breakdown of the secondary acid generator, with formation of a quantity of second acid substantially greater than the quantity of unbuffered superacid generated by the exposures. The heat applied also raises the acid-generating layers 52, 58 and 64 and the color-change layers 54, 60 and 66 above their glass transition temperatures, thus causing the components present in each acid-generating layer to intermix with the components present in its associated color-change layer. Accordingly, the three associated pairs of acid-generating and color-change layers are "developed" and fixed as described in the aforementioned copending application Ser. No. 08/232,725 now U.S. Pat. No. 5,441, 850; i.e., the copper compound decomposes the remaining superacid precursor and the base neutralizes the unbuffered superacid present. In these exposed areas, the second acid produced in the acid-generating layer effects the color change of the image dye in the associated color-change layer, thereby forming yellow, magenta and cyan images in the layers 54, 60 and 66 respectively. In the non-exposed areas, excess base remains and the image dye remains uncolored. The acid-impermeable interlayers 56 and 62 prevent the unbuffered superacid or the second acid generated in the second and third acid-generating layers 58 and 64 respectively migrating to the first and second color-change layers 54 and 60 respectively, thus preventing crosstalk among the three images. The mixing of the components present in each bilayer also causes the base present in each of the color-change layers to deprotonate the protonated forms of the sensitizing dye (in the layers using indicator sensitizing dye) present in the non-exposed areas of its associated acid-generating layer, thus removing the visible absorption due to the protonated sensitizing dye, and reducing the $D_{min}$ of the images to a low level.

Accordingly, at the conclusion of this heating step, in the areas of the imageable layer overlying the first set of first electrodes, the layer 54 is colored yellow, the layer 60 is colored magenta but the layer 64 is colorless, and the combination of yellow and magenta produces red filter elements. Similarly, in the areas of the imageable layer overlying the second set of first electrodes, the layer 54 is colored yellow, the layer 60 is colorless and the layer 64 is colored cyan, and the combination of yellow and cyan produces green filter elements. Finally, in the areas of the imageable layer overlying the third set of first electrodes, the layer 54 is colorless, the layer 60 is colored magenta and the layer 64 is colored cyan, and the combination of magenta and cyan produces blue filter elements If the spaces between the first electrodes are transparent to the exposing radiations, it will be seen that the areas of the imageable layer 44 overlying these spaces will be exposed during each of the three exposures. Consequently during the developing and fixing step, in the areas overlying the spacers, all three color-forming layers will develop color and the overlying areas will appear black, thus providing a black grid the prevent light leakage through the spaces between the first electrodes and thus improve the contrast of the display device.

It will be apparent that numerous changes and modifications can be made in the preferred process of the invention just described without departing from the scope of the invention. In particular, although in the preferred process all components of the display device are present before the formation of the filter elements, in other cases it may be convenient to add certain components after the formation of the filter elements. For example, if desired the antireflection coating 48 may be applied to the second support member 46 after the filter elements have been formed in the imageable layer 44. Also, if the process used to align the filter elements with the electrodes does not require that both polarizing layers be present as the filter elements are formed, the protective layers 12 and 16 and the first polarizing layer 14 may be added to the display device after the filter elements have been formed.

Furthermore, although the preferred display device described above has a first support member of non-planarized glass and a second support member of plastic, both support members may be of plastic, or a planarized glass support member may be used if desired. Indeed, the display device of the present invention may be constructed with two glass support members if desired. In this case, however, since it is generally not convenient to coat the imageable layer directly on to a glass support member, the imageable layer is conveniently coated on to a plastic film, this film carrying either a surface treatment or a release coating which ensures that the imageable layer is not too strongly adherent to the film. After the imageable layer has been coated on the film, an adhesive layer is coated on the imageable layer, and then the coated film is laminated to the glass support member so that the adhesive layer sticks the imageable layer firmly to the glass. Finally, the plastic film is peeled from the imageable layer and discarded, leaving the imageable layer secured to the glass support member.

From the foregoing, it will be seen that the present invention provides a process for the production of a color filter in a liquid crystal display device which requires only a small number of steps and which can be carried out with the display device completely assembled, thus avoiding any risk that the filter will be damaged or contaminated during later processing or assembly. Moreover, preferred variants of the present process allow one to use the light shutter effect of the liquid crystal layer itself to align the filter elements with the pixels of the display, and to form a black grid between the pixels of the display at the same time that the filter elements themselves are being formed.

I claim:

1. A process for the production of a liquid crystal display device having a color filter, the process comprising:

providing an assembly comprising, in order, a first support member, a plurality of first electrodes secured to the first support member, a liquid crystal layer, at least one second electrode and a second, substantially transparent support member, the assembly further comprising an imageable layer which, upon exposure to actinic radiation, can form three different colors, this imageable layer being disposed between the first and second support members; and exposing the assembly to actinic radiation so as to produce in the imageable layer a plurality of filter elements of first, second and third colors, said filter elements being aligned with the first electrodes, thereby forming a color filter lying between the first and second support members.

2. A process according to claim 1 wherein a repeating feature of the first electrodes is detected, and the exposure to actinic radiation is controlled so that the filter elements are formed in registration with the repeating feature.

3. A process according to claim 1 wherein the first support member comprises a sheet of non-planarized glass and the second support member comprises a sheet of plastic.

4. A process according to claim 3 further comprising a polarizing layer disposed between the second support member and the second electrode.

5. A process according to claim 4 wherein the polarizing layer is a linear dichroic polarizing layer comprising a stretched poly(vinyl alcohol) sheet containing polyvinylene light-polarizing species.

6. A process according to claim 5 wherein the polarizing layer is a silylated poly(vinyl alcohol) sheet stabilized by organosilylation treatment against humidity and heat.

7. A process according to claim 1 wherein the second electrode comprises a sandwich of silver between layers of titanium dioxide, or a sandwich of gold and silver layers between layers of titanium dioxide.

8. A process for the production of a liquid crystal display device having a color filter, the process comprising:

providing an assembly comprising, in order, a first support member, a plurality of first electrodes secured to the first support member, a liquid crystal layer, at least one second electrode and a second, substantially transparent support member, the assembly further comprising an imageable layer which, upon exposure to actinic radiation, can form three different colors, this imageable layer being disposed between the first and second support members; and exposing the assembly to actinic radiation so as to produce in the imageable layer a plurality of filter elements of first, second and third colors, said filter elements being aligned with the first electrodes, thereby forming a color filter lying between the first and second support members, wherein at least some of the filter elements are formed by applying a potential difference between some of the first electrodes and the second electrode while not applying a potential difference between others of the first electrodes and the second electrode, so that some parts of the liquid crystal layer are rendered substantially non-transmissive of radiation while other parts of the liquid crystal layer are rendered transmissive of radiation, and passing the actinic radiation through the liquid crystal layer, so that exposure of the imageable layer only occurs in parts of the imageable layer adjacent the transmissive parts of the liquid crystal layer.

9. A process according to claim 8 wherein the imageable layer is disposed between the second support member and the liquid crystal layer.

10. A process according to claim 9 wherein the first electrodes are divided into first, second and third sets, and wherein filter elements of the three different colors are formed in alignment with the first, second and third sets of the first electrodes by:

applying a potential difference between the second and third sets of first electrodes and the second electrode, thereby rendering the liquid crystal adjacent the second and third sets of first electrodes substantially non-transmissive of radiation;

passing actinic radiation through the first support and the liquid crystal layer, thereby permitting the actinic radiation to pass through the liquid crystal adjacent the first set of first electrodes but not through the liquid crystal adjacent the second and third sets thereof, and thereby effecting an imagewise change in the portions of the imageable layer aligned with the first set of first electrodes;

thereafter, applying a potential difference between the first and third sets of first electrodes and the second electrode, thereby rendering the liquid crystal adjacent the first and third sets of first electrodes substantially non-transmissive of radiation;

passing actinic radiation through the first support and the liquid crystal layer, thereby permitting the actinic radiation to pass through the liquid crystal adjacent the second set of first electrodes but not through the liquid crystal adjacent the first and third sets of first electrodes, and thereby effecting an imagewise change in the portions of the imageable layer aligned with the second set of first electrodes;

thereafter, applying a potential difference between the first and second sets of first electrodes and the second electrode, thereby rendering the liquid crystal adjacent the first and second sets of first electrodes substantially non-transmissive of radiation; and passing actinic radiation through the first support and the liquid crystal layer, thereby permitting the actinic radiation to pass through the liquid crystal adjacent the third set of first electrodes but not through the liquid crystal adjacent the first and second sets of first electrodes, and thereby effecting an imagewise change in the portions of the imageable layer aligned with the third set of first electrodes.

11. A process according to claim 8 wherein the passage of the actinic radiation through the liquid crystal layer is effected by moving at least one spot of actinic radiation across the imageable layer to form the filter elements while the position of the spot of radiation is controlled relative to the pattern in the liquid crystal layer.

12. A process according to claim 8 wherein the color-forming composition comprises a radiation absorber capable of absorbing actinic radiation and a leuco dye that, upon absorption of radiation by the radiation absorber, forms the colored material.

13. A process according to claim 12 wherein, upon absorption of the actinic radiation, the radiation absorber generates heat within the imageable layer, and the leuco dye undergoes a thermal reaction to form the colored material.

14. A process according to claim 13 wherein the leuco dye comprises any one of:

a. an organic compound capable of undergoing, upon heating, an irreversible unimolecular fragmentation of at least one thermally unstable carbamate moiety, this organic compound initially absorbing radiation in the visible or the non-visible region of the electromagnetic spectrum, the unimolecular fragmentation visibly changing the appearance of the organic compound;

b. a substantially colorless di- or triarylmethane imaging compound possessing within its di- or triarylmethane structure an aryl group substituted in the ortho position to the meso carbon atom with a moiety ring-closed on the meso carbon atom to form a 5- or 6-membered ring, the moiety possessing a nitrogen atom bonded directly to the meso carbon atom and the nitrogen atom being bound to a group with a masked acyl substituent that undergoes fragmentation upon heating to liberate the acyl group for effecting intramolecular acylation of the nitrogen atom to form a new group in the ortho position that cannot bond to the meso carbon atom, whereby the di- or triarylmethane compound is rendered colored;

c. a colored di- or triarylmethane imaging compound possessing within its di- or triarylmethane structure an aryl group substituted in the ortho position to the meso carbon atom with a thermally unstable urea moiety, the urea moiety undergoing a unimolecular fragmentation reaction upon heating to provide a new group in the ortho position that bonds to the meso carbon atom to form a ring having 5 or 6 members, whereby the di- or triarylmethane compound becomes ring-closed and rendered colorless;

d. in combination, a substantially colorless di- or triarylmethane compound possessing on the meso carbon atom within its di- or triarylmethane structure an aryl group substituted in the ortho position with a nucleophilic moiety which is ring-closed on the meso carbon atom, and an electrophilic reagent which upon heating and contacting the di- or triarylmethane compound undergoes a bimolecular nucleophilic substitution reaction with the nucleophilic moiety to form a colored, ring-opened di- or triarylmethane compound;

e. a compound of the formula

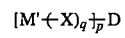

wherein M' has the formula:

wherein R is alkyl; —SO$_2$R$^1$ wherein R$^1$ is alkyl; phenyl; naphthyl; or phenyl substituted with alkyl, alkoxy, halo, trifluoromethyl, cyano, nitro, carboxyl, —CONR$^2$R$^3$ wherein R$^2$ and R$^3$ each are hydrogen or alkyl, —CO$_2$R$^4$ wherein R$^4$ is alkyl or phenyl, —COR$^5$ wherein R$^5$ is amino, alkyl or phenyl, —NR$^6$R$^7$ wherein R$^6$ and R$^7$ each are hydrogen or alkyl, —SO$_2$NR$^8$R$^9$ wherein R$^8$ and R$^9$ each are hydrogen, alkyl or benzyl; Z' has the formula:

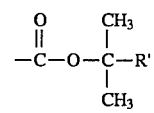

wherein R' is halomethyl or alkyl; X is —N═, —SO$_2$— or —CH$_2$—; D taken with X and M' represents the radical of a color-shifted organic dye; q is 0 or 1; and p is a whole number of at least 1; Z' being removed from M' upon the application of heat to effect a visually discernible change in spectral absorption characteristics of the dye;

f. a substantially colorless di- or triarylmethane compound of the formula:

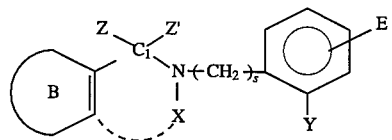

wherein ring B represents a carbocyclic aryl ring or a heterocyclic aryl ring; C$_1$ represents the meso carbon atom of the di- or triarylmethane compound; X represents —C(=O)—; —SO₂— or —CH₂— and completes a moiety ring-closed on the meso carbon atom, the moiety including the nitrogen atom bonded directly to the meso carbon atom; Y represents —NH—C(=O)—L, wherein L is a leaving group that departs upon thermal fragmentation to unmask —N=C=O for effecting intramolecular acylation of the nitrogen atom to open the N-containing ring and form a new group in the ortho position of ring B that cannot bond to the meso carbon atom; E is hydrogen, an electron-donating group, an electron-withdrawing group or a group, either an electron-donating group or an electron-neutral group that undergoes fragmentation upon heating to liberate an electron-withdrawing group; s is 0 or 1; and Z and Z' taken individually represent the moieties to complete the auxochromic system of a diarylmethane or triarylmethane dye when the N-containing ring is open, and Z and Z' taken together represent the bridged moieties to complete the auxochromic system of a bridged triarylmethane dye when the N-containing ring is open;

g. a colorless precursor of a preformed image dye substituted with (a) at least one thermally removable protecting group that undergoes fragmentation from the precursor upon heating and (b) at least one leaving group that is irreversibly eliminated from the precursor upon heating, provided that neither the protecting group nor the leaving group is hydrogen, the protecting and leaving groups maintaining the precursor in its colorless form until heat is applied to effect removal of the protecting and leaving groups whereby the colorless precursor is converted to an image dye;

h. a mixed carbonate ester of a quinophthalone dye and a tertiary alkanol containing not more than about 9 carbon atoms;

i. a leuco dye represented by:

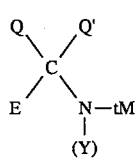

wherein:

E represents a thermally removable leaving group;

tM represents a thermally migratable acyl group;

Q, Q' and C taken together represent a dye-forming coupler moiety wherein C is the coupling carbon of the coupler moiety;

and, (Y) taken together with N represents an aromatic amino color developer, one of Q, Q' and (Y) containing an atom selected from the atoms comprising Group 5A/Group 6A of the Periodic Table, the groups E and tM maintaining the leuco dye in a substantially colorless form until the application of heat causes the group E to be eliminated from the leuco dye and the group tM to migrate from the N atom to the Group 5A/Group 6A atom thereby forming a dye represented by:

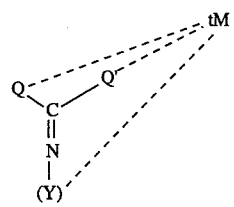

wherein the dotted lines indicate that the tM group is bonded to the Group 5A/Group 6A atom in one of Q, Q' and (Y).

15. A process according to claim 12 wherein, upon absorption of the actinic radiation, the radiation absorber generates acid within the imageable layer, and, upon exposure to this acid, the leuco dye forms the colored material.

16. A process according to claim 15 wherein the imageable layer further comprises a superacid precursor capable of being decomposed, by radiation of a wavelength shorter than that of the actinic radiation absorbed by the radiation absorber, to form a superacid, the superacid precursor, in the absence of the radiation absorber, not being decomposed by the actinic radiation absorbed by the radiation absorber but, in the presence of the radiation absorber and the actinic radiation absorbed by the radiation absorber, decomposing to form a protonated product derived from the radiation absorber, the color-forming composition further comprising a secondary acid generator capable of being thermally decomposed to form a second acid, the thermal decomposition of the secondary acid generator being catalyzed in the presence of the superacid derived from the superacid precursor, and the leuco dye undergoing a change to form the colored material in the presence of the second acid.

17. A process according to claim 16 wherein the radiation absorber has a unprotonated form and a protonated form, the protonated form having substantially greater substantial absorption in the first wavelength range than the unprotonated form.

18. A process according to claim 17 wherein the imageable layer comprises:

a first acid-generating layer comprising a radiation absorber in its protonated form, a superacid precursor and a secondary acid generator;

a first color-change layer disposed adjacent the first acid-generating layer and comprising a base and a first leuco dye undergoing a change in its absorption of radiation upon contact with the secondary acid generated upon acid-catalyzed decomposition of the secondary acid generator in the first acid-generating layer;

a first acid-resistant interlayer superposed on the first acid-generating layer and the first color-change layer;

a second acid-generating layer disposed on the opposed side of the first acid-resistant interlayer from the first acid-generating layer and the first color-change layer, the second acid-generating layer comprising a radiation absorber in its unprotonated form, a superacid precursor and a secondary acid generator, the second acid-generating layer further comprising a first auxiliary sensitizer which renders the superacid precursor therein susceptible to decomposition by actinic radiation of a first wavelength in the second wavelength range, but not susceptible to decomposition by actinic radiation of a second wavelength in the second wavelength range;

a second color-change layer disposed adjacent the second acid-generating layer and on the opposed side of the first acid-resistant interlayer from the first acid- generating layer and the first color-change layer, the second color-change layer comprising a base and a second leuco dye undergoing a change in its absorption of radiation upon contact with the secondary acid generated upon acid-catalyzed decomposition of the secondary acid generator in the second acid-generating layer, the absorption change undergone by the second leuco dye being different from that undergone by the first leuco dye;

a second acid-resistant interlayer disposed on the opposed side of the second acid-generating layer and second color-change layer from the first acid-resistant interlayer;

a third acid-generating layer disposed on the opposed side of the second acid-resistant interlayer from the second acid-generating layer and second color-change layer, the third acid-generating layer comprising a radiation absorber in its unprotonated form, a superacid precursor and a secondary acid generator, the third acid-generating layer further comprising a second auxiliary sensitizer which renders the superacid precursor therein susceptible to decomposition by actinic radiation of the second wavelength in the second wavelength range, but not susceptible to decomposition by actinic radiation of the first wavelength in the second wavelength range; and a third color-change layer disposed adjacent the third acid-generating layer and on the opposed side of the second acid-resistant interlayer from the second acid-generating layer and the second color-change layer, the third color-change layer comprising a base and a third leuco dye undergoing a change in its absorption of radiation upon contact with the secondary acid generated upon acid-catalyzed decomposition of the secondary acid generator in the third acid-generating layer, the absorption change undergone by the third leuco dye being different from those undergone by the first and second leuco dyes.

19. A process for the production of a liquid crystal display device having a color filter comprising a plurality of filter elements spaced from one another, the display device further comprising an essentially opaque grid covering the spaces between the spaced filter elements, the process comprising:

providing an assembly comprising, in order, a first support member, a plurality of first electrodes secured to the first support member, a liquid crystal layer, at least one second electrode and a second, substantially transparent support member, the assembly further comprising the color filter disposed between the first and second support members and an imageable layer also disposed between the first and second support members, the imageable layer being capable of undergoing a change in opacity upon exposure to actinic radiation; and exposing selected portions of the imageable layer to actinic radiation, thereby leaving portions of the imageable layer aligned with the spaces between the filter elements essentially opaque but the portions of the imageable layer aligned with the filter elements themselves essentially transparent, and thereby forming the grid.

20. A process according to claim 19 wherein the imageable layer is substantially transparent prior to exposure to the actinic radiation, and wherein the process comprises rendering the parts of the liquid crystal layer adjacent the filter elements substantially opaque to radiation, and passing actinic radiation through the liquid crystal layer, so that exposure of the imageable layer only occurs in parts of the imageable layer aligned with the spaces between the filter elements, thereby rendering these parts of the imageable layer substantially opaque and thereby forming the grid.

* * * * *